United States Patent
Iwakiri

(10) Patent No.: US 8,567,819 B2
(45) Date of Patent: Oct. 29, 2013

(54) GAS GENERATOR ASSEMBLY

(75) Inventor: Toshiro Iwakiri, Hyogo (JP)

(73) Assignee: Daicel Corporation, Osaka-Shi, Osaka (JP)

( * ) Notice: Subject to any disclaimer, the term of this patent is extended or adjusted under 35 U.S.C. 154(b) by 0 days.

(21) Appl. No.: 13/585,531

(22) Filed: Aug. 14, 2012

(65) Prior Publication Data
US 2013/0048760 A1    Feb. 28, 2013

Related U.S. Application Data
(60) Provisional application No. 61/527,568, filed on Aug. 25, 2011.

(30) Foreign Application Priority Data
Aug. 24, 2011 (JP) ................... 2011-182129

(51) Int. Cl.
B60R 21/26 (2011.01)
(52) U.S. Cl.
USPC .......................................... 280/741
(58) Field of Classification Search
USPC ................... 280/736, 740, 741, 742
See application file for complete search history.

(56) References Cited

U.S. PATENT DOCUMENTS

| | | | |
|---|---|---|---|
| 4,114,924 A * | 9/1978 | Kasagi et al. | 280/740 |
| 5,542,702 A * | 8/1996 | Green et al. | 280/737 |
| 5,671,945 A | 9/1997 | Rhule et al. | |
| 6,123,358 A * | 9/2000 | Ryan et al. | 280/739 |
| 6,168,199 B1 * | 1/2001 | Faigle | 280/736 |
| 6,705,637 B1 | 3/2004 | Goto et al. | |
| 7,938,443 B1 | 5/2011 | Smith | |
| 8,007,003 B2 * | 8/2011 | Kalandek | 280/740 |
| 2007/0063489 A1 * | 3/2007 | Dinsdale et al. | 280/728.2 |
| 2007/0284862 A1 | 12/2007 | Kashiwagi | |
| 2010/0201111 A1 | 8/2010 | Yamazaki et al. | |

FOREIGN PATENT DOCUMENTS

| | | |
|---|---|---|
| DE | 102008029903 A1 | 12/2009 |
| JP | 2001-191890 A | 7/2001 |
| JP | 2010-184559 A | 8/2010 |

OTHER PUBLICATIONS
International Search Report for International Application No. PCT/JP2012/070281 dated Nov. 16, 2012.

(Continued)

Primary Examiner — Faye M. Fleming
(74) Attorney, Agent, or Firm — Birch, Stewart, Kolasch & Birch, LLP

(57) ABSTRACT

A gas generator assembly for a restraining device includes: a gas generator including, a housing, a cup-shaped diffuser having a gas discharge port and attached to one end of the housing, a cup-shaped gas flow controller assembled with the gas generator, an outer diameter of the diffuser being smaller than that of the housing,
a gas flow controller having a bottom surface, a circumferential wall portion and an opening portion, the bottom surface being provided with a communication hole for allowing passage of gas flow, the circumferential wall portion surrounding the gas discharge port, the gas flow controller being attached to form a gap between a peripheral edge of the opening portion and the housing, and gas, discharged from the gas discharge port, colliding the circumferential wall portion, the gas flow being divided into both sides in an axial direction to flow out from the gap and the communication hole.

9 Claims, 4 Drawing Sheets

(56) References Cited

OTHER PUBLICATIONS

Notification of Transmittal of International Search Report for International Application No. PCT/JP2012/070281 dated Nov. 16, 2012.
Written Opinion of the International Search Authority for International Application No. PCT/JP2012/070281 dated Nov. 16, 2012.

* cited by examiner

US 8,567,819 B2

GAS GENERATOR ASSEMBLY

This nonprovisional application claims priority under 35 U.S.C. §119(a) to Patent Application No. 2011-182129 filed in Japan on 24 Aug. 2011 and 35 U.S.C. §119(e) to U. S. Provisional application No. 61/527,568 filed on 25 Aug. 2011, which are incorporated by reference.

BACKGROUND OF INVENTION

1. Field of Invention

The present invention relates to a gas generator assembly for use in a restraining device of a vehicle such as an airbag apparatus, and an airbag apparatus in which the gas generator assembly is used.

An air bag apparatus is a device for protecting an occupant at the time of the impact with an airbag inflated by introducing an inflating gas generated from a gas generator.

A gas discharge direction should be determined to avoid generation of a thrust force in such a case that the gas generator is activated improperly prior to attachment thereof to a vehicle or the airbag. And when the gas generator is attached to a module and activated, the introduction of the gas into the airbag is regulated in a manner that the airbag is deployed basically symmetrically.

Especially in the case of a gas generator using a cylindrical housing in which a gas discharge port is provided at one end in the axial direction of the housing, gas is fed preferentially in the vicinity of the gas discharge port in an airbag. This causes uneven deployment or primarily partial inflation of the airbag. In this case, sufficient restraining performance cannot be realized.

For this reason, a gas generator is designed to cancel a thrust force by setting the discharge direction of the gas to be radial. Further, in order to evenly deploy an airbag, gas flow is dispersed in the axial direction by using a means such as to flow an inflation gas, which is generated in one end in the axial direction of a housing of an air bag, towards the opposite end.

2. Description of Related Art

U.S. Pat. No. 5,671,945 discloses a gas generator in which a gas discharge opening 46 is formed at an axial end portion of a housing (main body portion 41). A diffuser cup 50 is attached to a periphery of the gas discharge opening 46. A tub portion 37 is provided on a disk portion 36 which is attached by welding to a peripheral edge of an axial distal end portion 49 of the gas generator. The tub portion 37 is inserted into an aperture 55 of the diffuser cup 50 and bent (a bent portion 38) to fix the diffuser cup 50. Accordingly, the diffuser cup 50 has the closed axial distal end portion 49 and an opening 57 at the opposite end portion. As a result, an inflation gas discharged from a gas discharge opening 46 collides against a wall portion 56 of the diffuser cup 50 and flows towards the opening 57.

US-A No. 2007/0284862 discloses a structure in which a sleeve 40 is provided to surround a convex portion 20a formed at one end of an inflator 20. In the sleeve 40, an opening 52 is formed in a central part of the closed portion (a squeezing portion) 40a at one end portion. An end portion on the opposite side is opened, and a tongue piece portion 40b is formed at part of a peripheral edge of the opening. A hole 48 is provided in the tongue piece portion 40b, and a bolt 44, which is extends from a clip 46 attached to an outer periphery of the inflator 20, is inserted through the hole 48. In other words, the sleeve 40 of US-A No. 2007/0284862 is fixed by the tongue piece portion 40b and the bolt 44 formed at a periphery of the inflator 20.

SUMMARY OF INVENTION

The present invention provides invention 1 of a gas generator assembly (1) for a restraining device, including:
a gas generator (10) including,
a housing (12) accommodating a gas generating member,
a cup-shaped diffuser (16) having a gas discharge port (14) for discharging gas generated from the gas generating member and being attached to one end of the housing (12),
a cup-shaped gas flow controller (20) assembled with the gas generator (10),
an outer diameter of the diffuser (16) being smaller than an outer diameter of the housing (12), a stud bolt (18) being provided to protrude from a bottom surface of the diffuser (16),
the gas flow controller (20) being in a cup-like shape having a bottom surface (24), a circumferential wall portion (23) and an opening portion (22), the bottom surface (24) being provided with a hole (28) for receiving the stud bolt (18) of the diffuser (16) therethrough and a communication hole (26) for allowing passage of gas flow,
the stud bolt (18) of the diffuser (16) being put through the hole (28) of the gas flow controller (20) from the opening portion (22), the circumferential wall portion (23) of the gas flow controller (20) surrounding the gas discharge port (14) of the diffuser (16), the circumferential wall portion (23) of the gas flow controller (20) and a circumferential wall portion (16b) of the diffuser (16) being spaced therebetween,
the gas flow controller (20) being attached such as to form a gap (G) between a peripheral edge of the opening portion (22) and the housing (12),
gas, discharged from the gas discharge port (14) of the gas generator, colliding the circumferential wall portion (23) of the gas flow controller (20), the gas flow being divided into both sides in the axial (X) direction to flow out from the gap (G) and the communication hole (26).

BRIEF DESCRIPTION OF DRAWINGS

The present invention will become more fully understood from the detailed description given hereinbelow and the accompanying drawings which are given by way of illustration only, and thus are not limitative of the present invention and wherein.

DETAILED DESCRIPTION OF INVENTION

Figure 4:
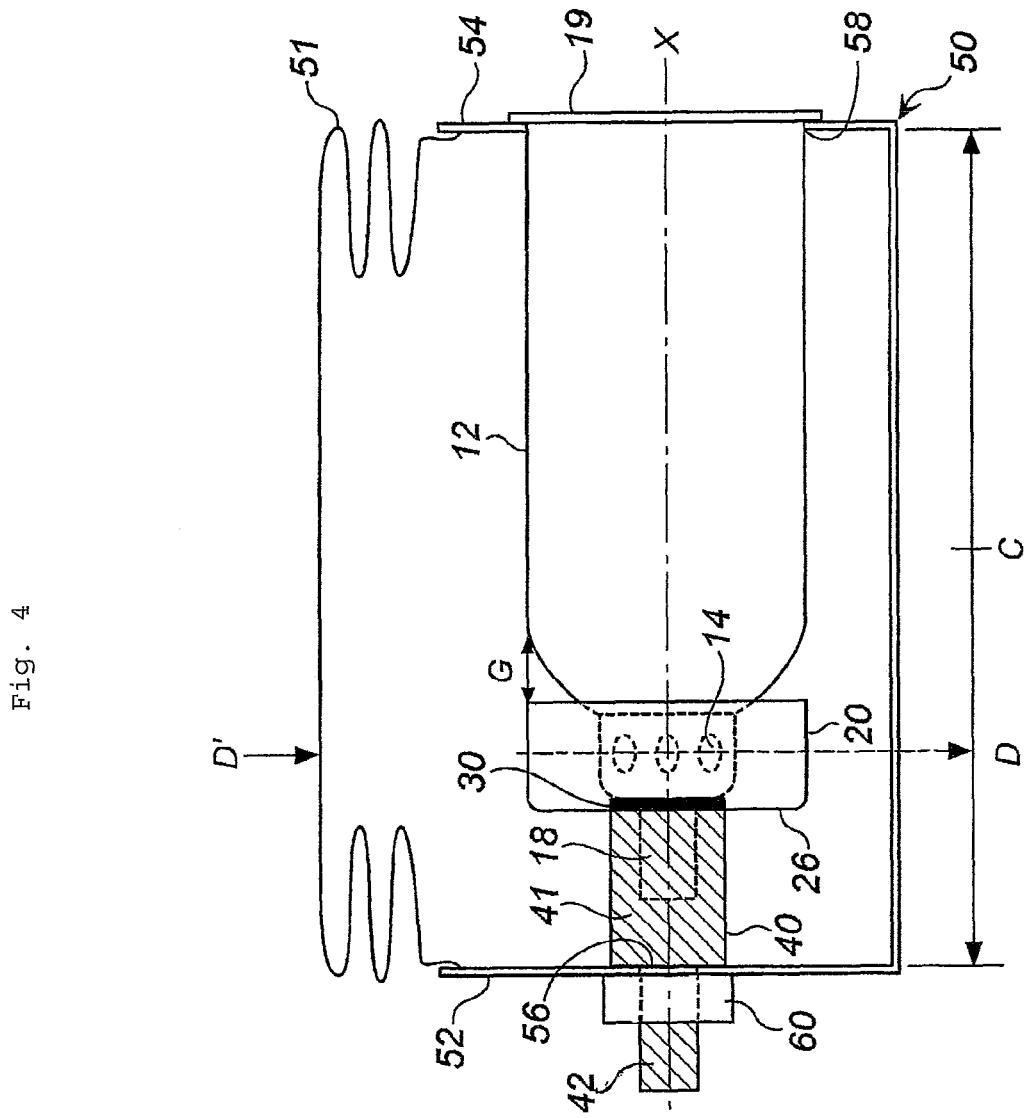
FIG. 4 shows a cross-sectional diagram of an airbag module case incorporating the gas generator assembly shown in FIG. 1.

In the gas generator disclosed in U.S. Pat. No. 5,671,945, the axial outermost tip 49 is closed. When this gas generator is activated accidentally, the gas flows axially in one direction, generating a thrust force. Because the diffuser cup 50 is attached to abut against the end wall (12, 212, 312) of the module case as shown in FIGS. 4, 8 and 9, the gas discharge openings 46 are necessarily positioned relatively biased (being offset) with respect to a center of the module case, with respect to the module case. Therefore, even when the diffuser cup 50 functions to change the direction of the flow of the gas, the gas cannot flow to the other side in the axial direction (the second end portion 45). This leaves room for improvement in symmetric deployment of an airbag.

In the inflator of US-A No. 2007/0284862, the gas flow is divided in the axial direction due to the hole 52, thereby preventing the generation of a thrust force: However, the gas tends to flow unevenly due to the presence of the tongue piece portion 40b. Moreover, because the sleeve 40 is disposed with distance from the outside of the inflator 20 having a constant outer diameter, it is basically difficult to adjust the gas flow flowing in two opposing directions.

The invention includes preferable embodiments 2 to 6 of invention 1 as follows:

Embodiment 2

The gas generator assembly for a restraining device according to invention 1, further including:

a spacer being disposed between, and in contact with, the bottom surface of the gas flow controller and the bottom surface of the diffuser, wherein a size of the gap and a total opening area of the communication hole for allowing passage of the gas therethrough are adjusted by the spacer.

Embodiment 3

The gas generator assembly for a restraining device according to invention 1 or embodiment 2, including:

a ring-shaped spacer, through which the stud bolt of the diffuser passes, being disposed between, and in contact with, the bottom surface of the gas flow controller and the bottom surface of the diffuser, being provided such that the stud bolt of the diffuser is penetrated therethrough, wherein a size of the gap for allowing passage of the gas therethrough is adjusted by adjusting a thickness of the spacer or the number of the spacers, and a total opening area of the communication hole for allowing passage of the gas therethrough is adjusted by adjusting a size or shape of the spacer.

Embodiment 4

The gas generator assembly for a restraining device according to invention 1 or any one of embodiments 2 and 3, further including:

an adapter (40) which is provided detachably to the stud bolt passing through the hole of the gas flow controller, wherein the adapter has, at one end thereof, a screw portion that is screwed to the stud bolt, and a bolt at the opposite end.

Embodiment 5

The gas generator assembly for a restraining device according to embodiment 2, further including:

an adapter (40) which is provided detachably to the stud bolt passing through the hole of the gas flow controller, wherein the adapter has, at one end thereof, a screw portion that is screwed to the stud bolt, and a bolt at the opposite end.

Embodiment 6

The gas generator assembly for a restraining device according to embodiment 3, further including:

an adapter (40) which is provided detachably to the stud bolt passing through the hole of the gas flow controller, wherein the adapter has, at one end thereof, a screw portion that is screwed to the stud bolt, and a bolt at the opposite end.

Embodiment 7

The gas generator assembly for a restraining device according to invention 1 or any one of embodiments 1 to 6, wherein the gas generator has a flange at an end surface thereof opposite to the diffuser of the housing.

Embodiment 8

The gas generator assembly for a restraining device according to embodiment 6, wherein the gas generator has a flange at an end surface thereof opposite to the diffuser of the housing.

Embodiment 9

An airbag apparatus in which the gas generator assembly for a restraining device according to invention 1 or any one of embodiments 2 to 8 is attached to a module case accommodating an airbag.

The present invention provides a gas generator assembly that is capable of adjusting a gas flow direction and a gas flow amount in order to deploy an airbag evenly, even when gas discharge ports are positioned toward one-side in the axial direction of an airbag module. The present invention also provides an airbag apparatus incorporating the gas generator assembly.

An airbag apparatus is assembled by attaching a gas generator to an inside of a module case accommodating an airbag.

When attaching a gas generator having different specifications each by each, such as the external shape and dimensions, to a common module case for a common component, a position of a diffuser varies in accordance with a type of a gas generator, so that a location in an airbag closest to the diffuser also varies, thereby possibly causing the airbag to deploy in various manners.

A similar problem can occur when attaching the same gas generator to a module case of a different type.

In the airbag apparatus, the airbag is deployed in a desired manner when the gas discharge port of the gas generator is positioned in a central part of the airbag. However, depending on the type of the gas generator, the gas discharge port is not located in the central part of the airbag when the gas generator is disposed in the module case. In such a case, it is difficult to redesign the gas generator so as to correspond with the size of the module case.

However, the gas generator assembly having the gas generator and the cup-shaped gas flow controller according to the present invention can provide a wide range of options for combining the gas generator and the module without redesigning the gas generator itself.

By combining the gas generator and the cup-shaped gas flow controller, the gas generator assembly according to the present invention has:

the communication hole formed on the bottom surface of the gas flow controller to allow passage of the gas therethrough (hereinafter, referred to as "gas flow communication hole") and the gap, formed between the peripheral edge portion of the opening portion of the gas flow controller and the housing, to allow passage of the gas therethrough (referred to as "gas flow gap," hereinafter).

Because the gas flow communication hole and the gas flow gap are located to oppose each other in the axial direction, the gas that is discharged from the gas discharge port of the diffuser flows axially in two opposing directions and is discharged more evenly to the airbag.

An amount of gas flowing in the two directions can be adjusted by restricting the relationship between a total opening area of the gas flow communication hole and an interval of the gas flow gap (a total opening area of the gap) to one of the following three embodiments:

(I) Total opening area of the gas flow communication hole>Interval of the gas flow gap (total opening area of the gap)

(II) Total opening area of the gas flow communication hole=Interval of the gas flow gap (total opening area of the gap)

(III) Total opening area of the gas flow communication hole<Interval of the gas flow gap (total opening area of the gap).

By a combination of the gas generator and the cup-shaped gas flow controller, the gas flow is divided axially into the two opposite directions, thereby canceling a thrust force easily. Therefore, even when the gas generator is activated accidentally before being incorporated in the module, a thrust force can be prevented from acting on the gas generator. In addition, by combining the gas generator with the gas flow controller, the gas, that is discharged from the gas discharge port of the diffuser, is prevented from directly colliding with the airbag and the like.

According to the gas generator assembly of the present invention, when combined with the module case including the airbag, the airbag is deployed evenly, and also substantially the same deployment performance is obtained even when gas generators of a different dimensions are combined with the same module case, as long as gas generators have almost the same output.

The gas generator used in the gas generator assembly of the present invention may be a pyrotechnic-type gas generator including a solid gas generating agent, a stored-type gas generator including pressurized gas, or a hybrid gas generator including both of a solid gas generating agent and pressurized gas.

In the present invention, a spacer is also used as a method for adjusting the total opening area of the gas flow communication hole and the total opening area of the gas flow gap (the interval of the gap) (the method for obtaining one of the embodiments (I) to (III)).

The spacer is disposed between, and in contact with, the bottom surface of the gas flow controller and the bottom surface of the diffuser.

Preferably, the spacer is in the shape of a ring and is disposed such that the stud bolt of the diffuser passes therethrough.

The total opening area of the gas flow gap (the interval of the gap) is controlled by adjusting a thickness of the spacer or the number of the spacers.

The total opening area of the gas flow communication hole is controlled by adjusting the size or shape of the spacer for closing the gas flow communication hole.

By the use of the spacer as described above, the axial position of the diffuser, obtained when the gas generator is attached to the module case, can be adjusted to achieve one of the embodiments (I) to (III).

The gas generator assembly of the present invention can be attached to the module case using the stud bolt provided in the diffuser. In so doing, the stud bolt is screwed into the module case so that the gas flow controller is held between the bottom surface of the diffuser and the module case.

Further, an adapter, which is provided detachably to the stud bolt passing through the hole of the gas flow controller, can be used for attaching the gas generator assembly of the present invention to the module case.

The adapter used here has, at its one end, a screw portion to be screwed to the stud bolt provided such as to protrude from the diffuser, and has, at its other end, a bolt for fixing, in a protruding manner out of the module case. When the adapter is used, the gas flow controller is held between the bottom surface of the diffuser and the adapter.

By the use of the adapter as described above, and by adjusting the length thereof, the axial position of the diffuser in the module case (the axial position of the gas discharge port) are adjusted.

In the attachment of the gas generator assembly of the present invention to the module case, when a flange is provided at an opposite end surface of housing to the diffuser, the attachment work and the sealing of the contact portion between the module case and the gas generator assembly are improved.

In the gas generator assembly of the present invention, by combining the gas generator and the gas flow controller, the gas is supplied into the two axially opposite directions of the gas generator assembly. And further, an amount of gas flowing in these two directions is adjusted.

Consequently, when the gas generator assembly of the present invention is incorporated into the module case accommodating the airbag, the gas is supplied evenly to the airbag, regardless of the axial length of the gas generator and the position of the gas discharge port corresponding thereto. As a result, the airbag is inflated and deployed in a desired manner.

Hence, the present invention can provide a wide range of options for combining the module case and the gas generator, contributing to reduction of costs and use of common components.

Details of Embodiments of Invention

<Gas Generator Assembly>

An embodiment of the gas generator assembly of the present invention will be described hereinafter with reference to FIGS. 1 and 2.

A gas generator assembly 1 of the present invention has a known gas generator 10 accommodating a gas generating member, and a gas flow controller 20 used in combination with the gas generator 10.

The gas generator 10 has a bottle-shaped housing 12 accommodating the gas generating member, and a diffuser 16 that is connected to the housing 12 and has gas discharge ports 14.

A hybrid-type gas generator, in which a combination of a gas generating agent and pressurized gas is used as the gas generating member, can be used as the gas generator 10. The example of the hybrid inflator is the one shown in FIG. 1 of JP-A No. 2001-191890. The gas generator 10 may be a pyrotechnic-type gas generator (e.g., JP-A No. 2010-184559).

Figure 1:
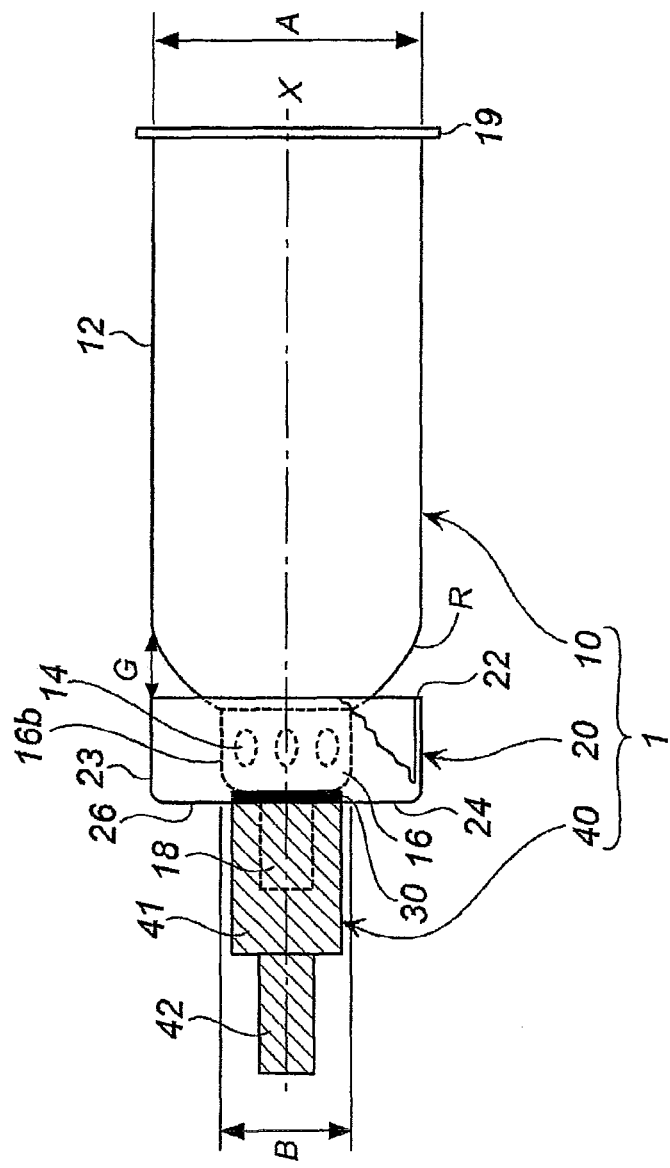
FIG. 1 shows a gas generator assembly of the present invention.
Figure 2:
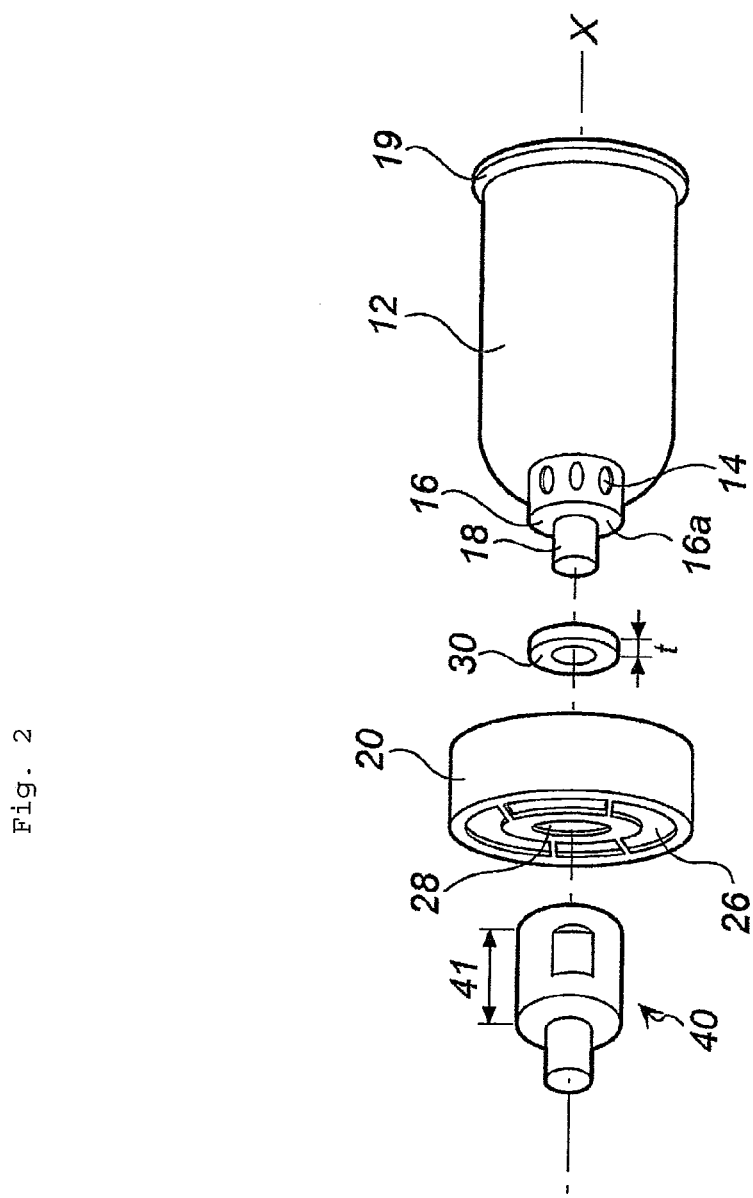
FIG. 2 shows an explanatory diagram (exploded perspective view of parts) of a method for assembling the gas generator assembly shown in FIG. 1.

As shown in FIG. 1, in the gas generator 10, the diameter of the diffuser 16 is set to be smaller than a diameter A of the housing 12. The diameter of the diffuser 16 is approximately 0.3 A to 0.9 A.

As shown in FIG. 1, the outer diameter of the gas generator 10 decreases gradually from the housing 12 towards the diffuser 16, and a curved surface R is formed. The diameter of the housing 12 excluding the curved surface R is constant.

The gas generator 10 is also obtained by forming the housing 12 into a cylindrical shape in an exterior appearance and providing the diffuser 16 at one end surface of the housing 12 in a protruding manner. Furthermore, the curved surface R may be formed in two steps.

It is preferred that a flange 19 be formed at an end portion of the housing 12 opposite to the diffuser 16. The flange 19 is a projection formed continuously in the circumferential direction of the housing 12 and functions to fix the gas generator 10 when the gas generator is attached to the module case.

The gas discharge ports 14 formed in the diffuser 16 are provided circumferentially at equal intervals on a circumferential wall portion of the diffuser 16. Therefore, the gas is released in the radial direction outwardly with respect to the central axis X of the gas generator 10 (i.e., the housing 12 and the diffuser 16).

A stud bolt (male screw) 18 extending in the axis X direction is attached to an end surface 16a of the diffuser 16.

The gas flow controller 20 is substantially cup-shaped and has a circumferential wall portion 23, an opening portion 22 at one end, and a bottom surface 24 at the other end.

An outer diameter of the gas flow controller 20 (an outer diameter of the circumferential wall portion 23) is set to be approximately equal to an outer diameter of the housing 12 (an outer diameter of the housing 12 excluding the curved surface R).

A central hole 28, for allowing passage of the stud bolt 18 therethrough, are formed at the central part of the bottom surface 24, and communication holes (gas flow communication holes) 26 for allowing passage of gas therethrough are provided at the remaining bottom surface.

Figure 3:
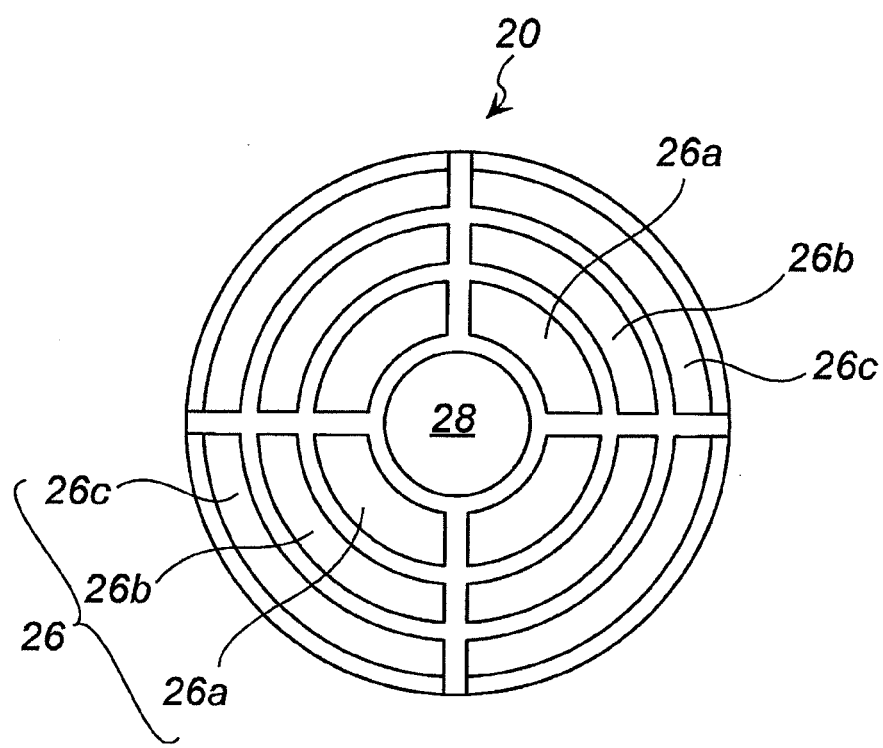
FIG. 3 shows a plan view of a gas flow controller in the gas generator assembly shown in FIG. 1.

The shape, a position of the communication holes (gas flow communication holes) 26 formed on the bottom surface 24 of the gas flow controller 20 are not particularly limited, and for example, they can be set as shown in FIG. 3.

The central hole 28 for allowing passage of the stud bolt 18 therethrough is formed at the central part, and the plurality of communication holes 26 are formed radially to surround the central hole 28. The plurality of communication holes 26 include a group of a first group of communication holes 26a (four in total) positioned on the circumference having the smallest diameter, a second group of communication holes 26b (four in total) positioned on the circumference having the medium diameter, and a third group of communication holes 26c (four in total) positioned on the circumference having the largest diameter.

Note in FIG. 1 that the stud bolt 18 is disposed on the axis X; however, the stud bolt 18 may be positioned in the end surface 16a of the diffuser 16, being deviated from the axis X (positioned eccentrically with respect to the axis X). When the stud bolt 18 is formed to position eccentrically with respect to the axis X as described above, the positions of the hole 28 and the communication holes 26 of the gas flow controller 20 can be changed accordingly.

The gas flow controller 20 is assembled with the gas generator 10 such that the opening portion 22 of the controller 20 is arranged in the housing 12 side, the bottom surface 24 thereof is arranged in an end surface 16a side of the diffuser 16 and a stud bolt 18 is passed through the central hole 28.

By assembling in the above manner, the circumferential wall portion 23 surrounds the gas discharge ports 14 of the diffuser 16 and the wall portion 23 is disposed at a distance from a circumferential wall portion 16b of the diffuser, and a gas flow gap G is formed between a peripheral edge portion of the opening portion 22 and the housing 12 (the curved surface R of the housing 12).

When a housing in a cylindrical shape in the exterior appearance is used as the housing 12, the gas flow gap G shown in FIG. 1 is formed by adjusting the height of the diffuser 16.

In the gas generator assembly 1 shown in FIG. 1, a spacer 30 is arranged between the bottom surface 24 of the gas flow controller 20 and the diffuser 16. A single spacer can be used as a spacer 30. Further two or more spacers having the same thickness t as each other or a different thickness from each other are also used preferably as the spacer 30.

The width of the gas flow gap G (the total opening area of the gas flow gap G) is adjusted to a desired range by using a single spacer with various thickness t. The width of the gas flow gap G is also adjusted with a plurality of spacers having various thickness t. When the width of the gas flow gap G is large, the gas flowing from the gas discharge ports 14 is released easily from the gas flow gap G.

When, for example, the spacer 30 has a disk-like shape, the diameter thereof can be adjusted to a desired length. However, when using a plurality of the spacers 30, the diameters thereof are preferably equal to each other.

The total opening area of the communication holes 26 of the bottom surface 24 is adjusted by using the spacers 30 of different sizes and shapes.

The area corresponding to the closed parts of the communication holes 26 of the bottom surface 24 increases when a relatively large spacer is used as the spacer 30 (a spacer that can cover the groups of first communication holes 26a and second communication holes 26b shown in FIG. 3), making the total opening area of the communication holes 26 relatively small (only the group of third communication holes 26c shown in FIG. 3 are opened).

The area corresponding to the closed parts of the communication holes 26 of the bottom surface 24 decreases when a relatively small spacer is used as the spacer 30 (a spacer that can cover only the group of first communication holes 26a shown in FIG. 3), making the total opening area of the communication holes 26 relatively large (the groups of second communication holes 26b and third communication holes 26c shown in FIG. 3 are opened). An amount of gas to be released is adjusted by adjusting the total opening area of the communication holes 26.

Moreover, for example, all of the first communication holes 26a and part of the second communication holes 26b are covered by adjusting the diameter of the disk-shaped spacer 30.

The spacer 30 may be a square or triangle but is preferably in the shape of a circular disk so that the initial settings do not change even when the spacer 30 itself rotates.

By adjusting the gas flow gap G (the total opening area) and the total opening area of the gas flow communication holes 26 by the spacer 30, as described above, like the embodiments (I) to (III), an amount of gas to be released from the gas flow gap G and gas glow communication holes can be adjusted accordingly.

In the gas generator assembly 1 shown in FIG. 1, the stud bolt 18 is screwed into an adapter 40. The gas generator assembly 1 of the present invention can include the adapter 40; however, the adapter 40 is not an essential component.

The adapter 40 has its female screw portion for the stud bolt 18 to be screwed thereto, formed inside a main body portion 41 of the adapter, and a bolt (male screw) 42 extending along the axis X is formed on the opposite end surface.

The bolt 42 is used for fixing when attaching the gas generator assembly 1 shown in FIG. 1 to the module case.

When attaching the gas generator assembly 1 to the module case the bolt 42 is put through a mounting hole formed in the module case and fixed by a nut. The adapter 40 and the bolt 42 are formed concentrically on the same axis X.

In the gas generator assembly 1 shown in FIG. 1, the gas flow controller 20 and the spacer 30 are held between the diffuser 16 and the adapter 40 by securing the adapter 40 to the stud bolt 18.

Further, interval of the gas flow gap G can easily be adjusted in the gas generator assembly 1 shown in FIG. 1, by removing the screwed adapter 40 and the gas flow controller 20 and changing the thickness of the spacer 30 or the number of the spacers 30.

<Airbag Module Attached with the Gas Generator Assembly>

FIG. 4 is a diagram of a module case 50 attached with the gas generator assembly 1 shown in FIG. 1.

An airbag 51 is attached, in a folded state, to an upper part of the module case 50.

The module case 50 has one end wall 52 and the other end wall 54 located opposite thereto. A first mounting hole 56 and a second mounting hole 58 are formed on the one end wall 52 and the other end wall 54, respectively.

The gas generator assembly 1 shown in FIG. 1 is inserted into the second mounting hole 58, and the bolt 42 of the adapter 40 is inserted into the first mounting hole 56. Thereafter, the bolt 42 is secured with a nut 60. In so doing, it is preferred that the housing 12 be provided with the flange 19 so that the flange 19 abuts on the outside of the other end wall 54. Note that a seal member such as a gasket may be arranged in the contact part between the flange 19 and the other end wall 54.

In the state shown in FIG. 4, the gas discharge ports 14 are positioned toward the one end wall 52 side(at a position D) with respect to a longitudinal intermediate point C in the direction of an axis X (coinciding with the axis X of the gas generator assembly 1) of the module case 50.

When the gas flow controller 20 does not exist, the generated gas is discharged from the gas discharge ports 14 at the position D in the direction of the axis X. Consequently, most of the gas supply to the airbag 51 is concentrated on the part (the position D), deviating from the intermediate point C in the direction of the axis X. As a result; a section in the airbag that corresponds to the position D (a part D') is preferentially deployed.

On the other hand, when using the gas generator assembly 1 of the present invention, the total opening area of the communication holes 26 and the interval of the gas flow gap G can be adjusted by the thickness, the number and the size of the spacer 30.

In FIG. 4, the area of the gas passage (total opening area) determined by the gas flow gap G is set to be greater than the total opening area of the gas flow communication holes 26. Therefore, the generated gas discharged from the gas discharge ports 14 collides with the circumferential wall portion 23 of the gas flow controller 20 and consequently splits into both sides of the axis X direction. In other words, the gas flow toward the one end wall 52 and the gas flow toward the other end wall 54.

Because the total opening area of the gas flow gap G is greater, the flow of gas (an amount of gas) flowing toward the other end wall 54 is greater than the flow of gas (an amount of gas) flowing toward the one end wall 52. Hence, the airbag 51 is deployed mainly from the intermediate portion C even when the gas discharge ports 14 exist at the position D.

In case of using a gas generator having a different length in the axis X direction, for example, a gas generator, that is shorter in the direction of the axis X than the gas generator 10 shown in FIG. 1 or 4, is attached to the module case 50 shown in FIG. 4, the gas discharge ports 14 are positioned closer to the intermediate portion C as a result of also attaching the flange 19 to the other end wall 54 of the module case 50, compared to the gas discharge ports 14 shown in FIG. 4. In addition, a larger space is formed between the diffuser 16 and the one end wall 52.

Then, the gas flow gap G is adjusted by adjusting the length of the adapter 40 (the main body portion 41) and the thickness of the spacer 30. In this case, because the gas discharge ports 14 are positioned closer to the intermediate portion C, an amount of gas flowing toward the one end wall 52 is increased by lowering the ratio of the total opening area obtained by the gas flow gap G to the total opening area of the communication holes 26.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator assembly (1) for a restraining device, comprising:
   a gas generator (10) including,
   a housing (12) accommodating a gas generating member,
   a cup-shaped diffuser (16) having a gas discharge port (14) for discharging gas generated from the gas generating member and being attached to one end of the housing (12),
   a cup-shaped gas flow controller (20) assembled with the gas generator (10),
   an outer diameter of the diffuser (16) being smaller than an outer diameter of the housing (12), a stud bolt (18) being provided to protrude from a bottom surface of the diffuser (16),
   the gas flow controller (20) being in a cup-like shape having a bottom surface (24), a circumferential wall portion (23) and an opening portion (22), the bottom surface (24) being provided with a hole (28) for receiving the stud bolt (18) of the diffuser (16) therethrough and a communication hole (26) for allowing passage of gas flow,
   the stud bolt (18) of the diffuser (16) being put through the hole (28) of the gas flow controller (20) from the opening portion (22), the circumferential wall portion (23) of the gas flow controller (20) surrounding the gas discharge port (14) of the diffuser (16), the circumferential wall portion (23) of the gas flow controller (20) and a circumferential wall portion (16*b*) of the diffuser (16) being spaced therebetween,
   the gas flow controller (20) being attached such as to form a gap (G) between a peripheral edge of the opening portion (22) and the housing (12),
   gas, discharged from the gas discharge port (14) of the gas generator, colliding the circumferential wall portion (23) of the gas flow controller (20), the gas flow being divided into both sides in the axial (X) direction to flow out from the gap (G) and the communication hole (26).

2. The gas generator assembly for a restraining device according to claim 1, further comprising:
   a spacer being disposed between, and in contact with, the bottom surface of the gas flow controller and the bottom surface of the diffuser, wherein
   a size of the gap and a total opening area of the communication hole for allowing passage of the gas therethrough are adjusted by the spacer.

3. The gas generator assembly for a restraining device according to claim 1, comprising:
   a ring-shaped spacer, through which the stud bolt of the diffuser passes, being disposed between, and in contact with, the bottom surface of the gas flow controller and the bottom surface of the diffuser, being provided such that the stud bolt of the diffuser is penetrated therethrough, wherein a size of the gap for allowing passage of the gas therethrough is adjusted by adjusting a thickness of the spacer or the number of the spacers, and a total opening area of the communication hole for allowing passage of the gas therethrough is adjusted by adjusting a size or shape of the spacer.

4. The gas generator assembly for a restraining device according to claims 1, further comprising:

an adapter (40) which is provided detachably to the stud bolt passing through the hole of the gas flow controller, wherein the adapter has, at one end thereof, a screw portion that is screwed to the stud bolt, and a bolt at the opposite end.

5. The gas generator assembly for a restraining device according to claim 2, further comprising:

an adapter (40) which is provided detachably to the stud bolt passing through the hole of the gas flow controller, wherein the adapter has, at one end thereof, a screw portion that is screwed to the stud bolt, and a bolt at the opposite end.

6. The gas generator assembly for a restraining device according to claim 3, further comprising:

an adapter (40) which is provided detachably to the stud bolt passing through the hole of the gas flow controller, wherein the adapter has, at one end thereof, a screw portion that is screwed to the stud bolt, and a bolt at the opposite end.

7. The gas generator assembly for a restraining device according to claim 5, wherein the gas generator has a flange at an end surface thereof opposite to the diffuser of the housing.

8. The gas generator assembly for a restraining device according to claim 6, wherein the gas generator has a flange at an end surface thereof opposite to the diffuser of the housing.

9. An airbag apparatus in which the gas generator assembly for a restraining device according to claim 1 is attached to a module case accommodating an airbag.

* * * * *